(12) United States Patent
Stjernholm et al.

(10) Patent No.: US 12,284,541 B2
(45) Date of Patent: Apr. 22, 2025

(54) METHODS, APPARATUS AND MACHINE-READABLE MEDIUMS RELATING TO TRACES IN A WIRELESS COMMUNICATION NETWORK

(71) Applicant: Telefonaktiebolaget LM Ericsson (publ), Stockholm (SE)

(72) Inventors: Paul Stjernholm, Lidingö (SE); Erik Westerberg, Enskede (SE); Mathias Sintorn, Sollentuna (SE); Patrik Karlsson, Sollentuna (SE); Ulf Eric Andretzky, Huddinge (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 667 days.

(21) Appl. No.: 17/416,702

(22) PCT Filed: Dec. 13, 2019

(86) PCT No.: PCT/SE2019/051274
§ 371 (c)(1),
(2) Date: Jun. 21, 2021

(87) PCT Pub. No.: WO2020/130911
PCT Pub. Date: Jun. 25, 2020

(65) Prior Publication Data
US 2022/0053355 A1 Feb. 17, 2022

Related U.S. Application Data

(60) Provisional application No. 62/783,295, filed on Dec. 21, 2018.

(51) Int. Cl.
*H04W 24/10* (2009.01)
*H04W 48/08* (2009.01)
(Continued)

(52) U.S. Cl.
CPC .......... *H04W 24/10* (2013.01); *H04W 48/08* (2013.01); *H04W 48/16* (2013.01); *H04W 88/085* (2013.01)

(58) Field of Classification Search
CPC ..... H04W 24/10; H04W 48/08; H04W 48/16; H04W 88/085
See application file for complete search history.

(56) References Cited

U.S. PATENT DOCUMENTS

| 2010/0113000 A1* | 5/2010 | Yao | H04W 24/08 455/422.1 |
| 2012/0039213 A1* | 2/2012 | Cheng | H04W 76/12 370/254 |

(Continued)

FOREIGN PATENT DOCUMENTS

| CN | 103262600 A | 8/2013 |
| JP | 2014525695 A | 9/2014 |

(Continued)

OTHER PUBLICATIONS

Qualcomm Incorporated , "Update of Solution#17", SA WG2 Meeting #129, S2-1810572, Dongguan, China, Oct. 15-19, 2018, 1-3.

(Continued)

*Primary Examiner* — Ayaz R Sheikh
*Assistant Examiner* — Tarell A Hampton
(74) *Attorney, Agent, or Firm* — Murphy, Bilak & Homiller, PLLC

(57) ABSTRACT

A method performed by a UE trace initiation node for a wireless communication network comprises transmitting, via a direct interface to a radio access network node or function, a trace request message comprising a request to initiate a trace on one or more user equipments. A method performed by a radio access network node or function for a wireless communication network comprises receiving, via a (Continued)

direct interface with a UE trace initiation node, a trace request message comprising a request to initiate a trace on one or more user equipments.

20 Claims, 13 Drawing Sheets

(51) Int. Cl.
*H04W 48/16* (2009.01)
*H04W 88/08* (2009.01)

(56) References Cited

U.S. PATENT DOCUMENTS

| | | | | |
|---|---|---|---|---|
| 2012/0309431 | A1* | 12/2012 | Bodog | H04W 16/18 455/456.6 |
| 2012/0315949 | A1* | 12/2012 | Zhang | H04W 24/08 455/517 |
| 2013/0114446 | A1* | 5/2013 | Liu | H04W 24/10 370/252 |
| 2013/0171944 | A1 | 7/2013 | Futaki et al. | |
| 2014/0113656 | A1* | 4/2014 | Schmidt | H04W 24/10 455/456.2 |
| 2016/0080959 | A1 | 3/2016 | Kim et al. | |
| 2020/0112879 | A1 | 4/2020 | Shimoda et al. | |

FOREIGN PATENT DOCUMENTS

| | | |
|---|---|---|
| WO | 2011161585 A1 | 12/2011 |
| WO | 2013021832 A1 | 2/2013 |
| WO | 2013066333 A1 | 5/2013 |
| WO | 2018198963 A1 | 11/2018 |

OTHER PUBLICATIONS

3GPP, "3GPP TS 32.421 V15.0.0", 3rd Generation Partnership Project; Technical Specification Group Services and System Aspects; Telecommunication management; Subscriber and equipment trace; Trace concepts and requirements (Release 15), Jun. 2018, 1-45.

3GPP, "3GPP TS 32.423 V15.0.0", 3rd Generation Partnership Project; Technical Specification Group Services and System Aspects; Telecommunication management; Subscriber and equipment trace; Trace data definition and management (Release 15), Jun. 2018, 1-93.

3GPP, "3GPP TS 38.401 V15.3.0", 3rd Generation Partnership Project; Technical Specification Group Radio Access Network; NG-RAN; Architecture description (Release 15), Sep. 2018, 1-39.

3GPP, "3GPP TS 28.533 V15.1.0", 3rd Generation Partnership Project; Technical Specification Group Services and System Aspects; Management and orchestration; Architecture framework (Release 15), Dec. 2018, 1-25.

3GPP, "3rd Generation Partnership Project; Technical Specification Group Radio Access Network; NG-RAN; Architecture description (Release 15)", 3GPP TS 38.401 V15.1.0, Mar. 2018, 1-23.

3GPP, "3rd Generation Partnership Project; Technical Specification Group Services and System Aspects; Telecommunication management; Subscriber and equipment trace; Trace control and configuration management (Release 15)", TS 32.422 V15.1.0, Jun. 2018, 1-189.

Huawei, "Support of MDT in NG-RAN", 3GPP TSG-RAN3 Meeting #101-bis, R3-186026, Chengdu, China, Oct. 8-12, 2018, 1-3.

Qualcomm Incorporated, "Solution of Key issue 13: Trace based solution to collect UE related information in NWDAF", SA WG2 Meeting #128Bis, S2-188515, Sophia Antipolis, France, Aug. 20-24, 2018, 1-4.

* cited by examiner

METHODS, APPARATUS AND MACHINE-READABLE MEDIUMS RELATING TO TRACES IN A WIRELESS COMMUNICATION NETWORK

TECHNICAL FIELD

Embodiments of the disclosure relate to wireless communication networks, and particularly to methods, apparatus and machine-readable mediums for requesting and initiating traces on wireless devices in a wireless communication network.

BACKGROUND

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

3GPP mobile networks provide the capability to initiate Subscriber and Equipment trace, also known as user equipment (UE) trace, as defined by the 3GPP 32-series specifications. See 3GPP TS 32.421 (v 15.0.0), 32.422 (v 15.1.0) and 32.423 (v 15.0.0) in particular. The Subscriber and Equipment trace provide detailed information at call level on one or more specific user equipments. It may give instantaneous values for a specific event (e.g. call, location update, etc.). It may provide the capability to log data on any interface at call level for a specific user (e.g. international mobile subscriber identity, IMSI) or mobile type (e.g. international mobile equipment identity, IMEI, or IMEI software version, IMEISV), or for a service initiated by a user. It may provide information such as a perception of end-user quality of service (QoS) during a call (e.g. requested QoS vs. provided QoS), correlation between protocol messages and radio frequency (RF) measurements, or interoperability with specific mobile vendors.

Subscriber and Equipment trace is also useful for optimization and troubleshooting as well as for slow radio resource management, analytics, self-optimizing networks, automation, training of machine learning models and more. To produce this data, Subscriber and UE Traces are carried out in the network entities (NEs) which comprise the network. The data can then be transferred to an external system (e.g. an Operations System (OS) in telecommunications management network (TMN) terminology), for further evaluation.

The 3GPP TS 32.422 (v 15.1.0) specification specifies the Trace control and configuration management. It further specifies that trace activation in LTE and NR is triggered via defined messages, e.g. Trace Start, Initial Context Setup Request or Handover Request. The trace activation contains the following information:

Trace Reference and Trace Recording Session Reference
Trace Depth, defining whether entire signaling messages or just some IEs need to be recorded
List of interfaces to be included
IP address of Trace Collection Entity The current radio access network (RAN) architecture for 5G defines base stations (or gNBs) comprising multiple component parts: a central unit (CU), one or more distributed units (DUs), and one or more radio units (RUs). The protocol layer stack of the base station is divided between the CU, the DUs and the RUs, with one or more lower layers of the stack implemented in the RUs, and one or more higher layers of the stack implemented in the CU and/or DU. The CU is coupled to the DUs via a fronthaul higher layer split (HLS) network; the CU/DUs are connected to the RUs via a fronthaul lower-layer split (LLS) network. The CU may be further split into one or more user-plane entities or functions (CU-UP) and one or more control-plane entities or functions (CU-CP). Over time additional functional entities may be specified as part of the radio access network, either as a result of a further split of existing entities or as entirely new entities. These include, but are not limited to, a radio intelligent controller entity and a radio network analytics entity.

SUMMARY

There currently exist certain challenge(s).

The current 3GPP solution does not allow a definition of which messages to include in the UE trace. Neither does it allow a selection of internal measurements in the RAN node to provide as part of a UE trace, nor specifying any conditions for triggering a UE trace. Furthermore, it only interfaces the CU-CP part of a split RAN architecture, thus, requiring communication from CU-CP to e.g. CU-UP and DU to forward any trace requests.

Since 3GPP defines open multivendor interfaces between the CU-CP, CU-UP and the DU, trace commands by a first vendor would have to be read, understood and mediated by a node provided by a second vendor, creating multi-vendor dependencies and slowing innovation.

Certain aspects of the present disclosure and their embodiments may provide solutions to these or other challenges.

Embodiments of the disclosure relate to a new interface between a UE trace initiation node (such as the Management System) and one or more radio access network nodes for invoking UE traces in RAN, including direct connection to e.g. CU-CP, CU-UP and DU of a split RAN architecture. The invoked UE trace may contain requested events as the UE roams through the mobile network. Further splits of the architecture into additional network entities may be addressed similarly, and thus embodiments of the present disclosure are not limited to the CU-CP, CU-UP and DU discussed above.

There are, proposed herein, various embodiments which address one or more of the issues disclosed herein. One aspect provides a method performed by a UE trace initiation node for a wireless communication network. The method comprises: transmitting, via a direct interface to a radio access network node or function, a trace request message comprising a request to initiate a trace on one or more user equipments.

Another aspect provides a method performed by a radio access network node or function for a wireless communication network. The method comprises: receiving, via a direct interface with a UE trace initiation node, a trace request message comprising a request to initiate a trace on one or more user equipments.

Certain embodiments may provide one or more of the following technical advantage(s). For example, embodiments may allow the UE trace initiation node to directly request UE traces from any RAN node in a split RAN architecture. The UE trace initiation node may further be provided with the capability to select the messages to be included in the UE trace, comprising messages over any associated interface as well as internal messages in the RAN node.

Embodiments of the disclosure may also provide conditions for triggering a UE trace. Such embodiments may enable innovation in what messages can be included in a trace since they remove the multivendor dependency between the UE trace command sent to the CU-CP and the content of that UE trace command targeting the DU or CU-UP.

DETAILED DESCRIPTION

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

The terms "node", "function" and "entity" may be used interchangeably herein.

Figure 1:
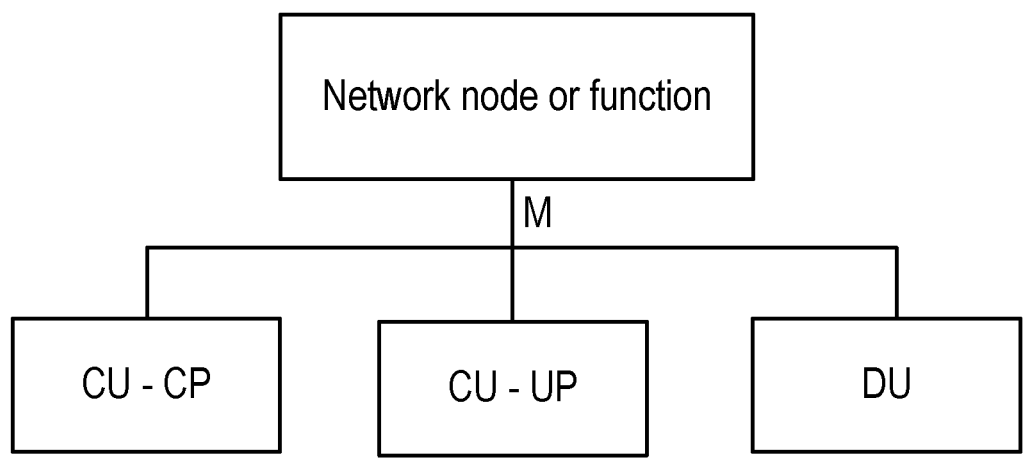
FIG. 1 shows an arrangement of network nodes in accordance with some embodiments of the disclosure.

FIG. 1 shows an arrangement of network nodes in accordance with some embodiments. Embodiments of the disclosure provide a direct interface from a network node or function with responsibility for initiating UE traces (hereinafter, "UE trace initiation node"), such as the Management System or node, to one or more radio access network nodes or functions (called network functions, NFs, or network entities, NEs, herein), e.g. the CU-CP, the CU-UP and the DU. The new interface is shown in FIG. 1, labelled "M". In one embodiment, the UE trace initiation node may also be located in the radio access network. In an alternative embodiment, the UE trace initiation node may be located in or connected to a core network. For example, the UE trace initiate node may be implemented in a network data analytics function (NWDAF) for a packet core function.

The UE trace initiation node may determine a need to collect additional data for one or more specific UEs. Using the new interface, the UE trace initiation node directly requests new traces for the one or more specific UE at the one or more radio access NFs. The new interface enables the UE trace initiation node to request initiation of a trace for one or more UEs (or one or more classes of UEs), directly with the radio access NFs. For example, a trace request message comprising a request to initiate a trace on one or more UEs may be transmitted by the UE trace initiation node to one or more (or all) of the NEs shown in FIG. 1.

Figure 2:
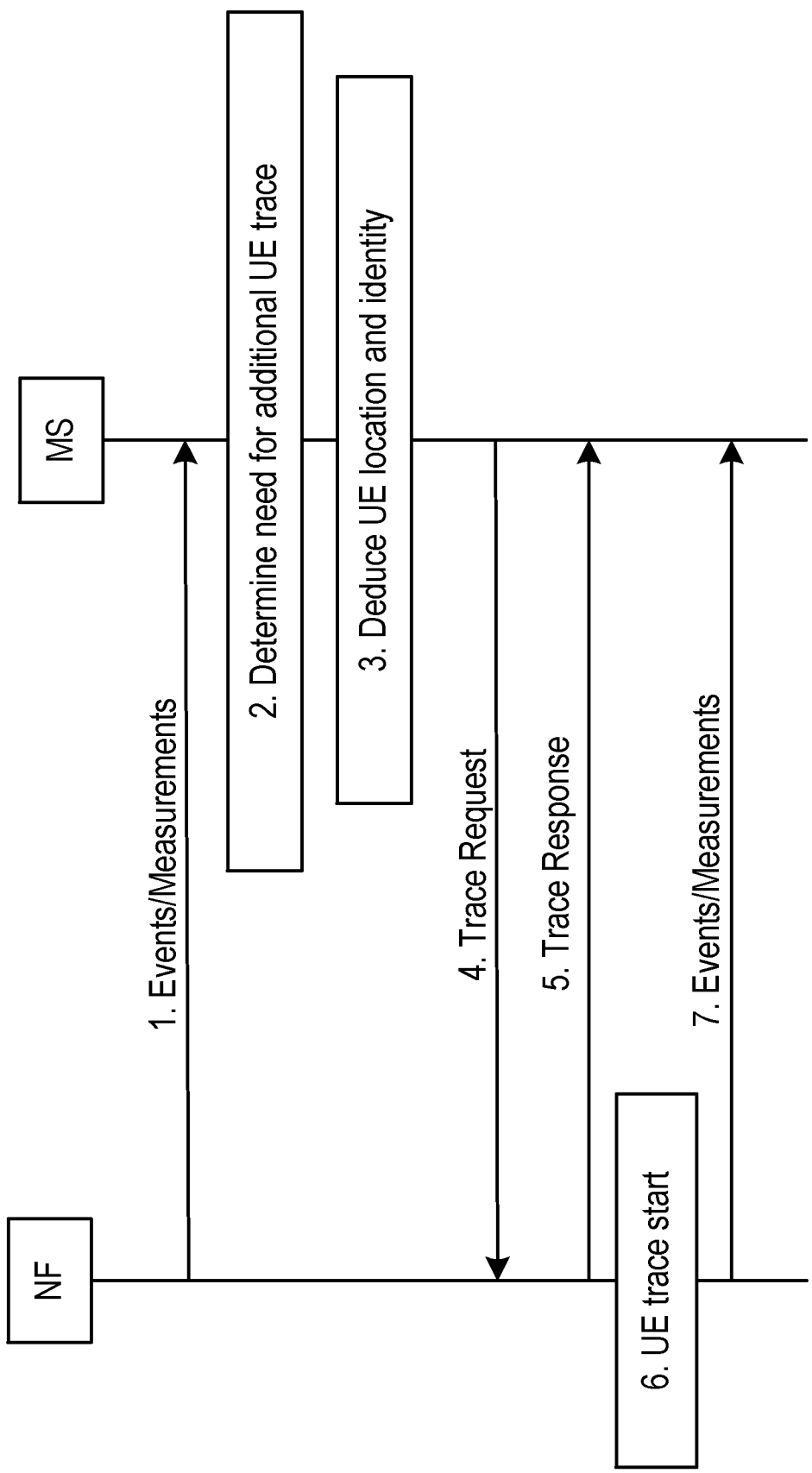
FIG. 2 is a signalling diagram in accordance with some embodiments of the disclosure.

FIG. 2 is a signaling diagram showing the process of initiating a trace for one or more UEs according to embodiments of the disclosure.

The signaling diagram in FIG. 2 depicts a scenario where the UE trace initiation node (here depicted as the Management System (MS)) interacts with a RAN NF (such as any of the RAN NFs shown above in FIG. 1) and requests a UE Trace.

1. The NFs of the RAN send event and measurement messages to the UE trace initiation node. These may comprise UE- and network-related events and measurements used for regular monitoring of one or more performance metrics, such as one or more of: accessibility, retainability and integrity. The messages may also comprise an identity of the NF sending the message. The UE trace initiation node may correlate local identities of UEs in a NF (i.e. identities for the UE used in the radio access network, such as one or more of: cell radio network temporary identifier (C-RNTI), eNB UE S1AP ID, mobility management entity (MME) UE S1AP ID, access and mobility management entity (AMF) UE next generation application protocol (NGAP) ID, RAN UE NGAP ID), provided by events from one or more RAN NFs, with their core network counterparts such as international mobile subscriber identity (IMSI) or subscriber identity, provided by one or more core network nodes, e.g. home subscriber server (HSS), unified data management (UDM), MME and/or AMF. The messages may be transmitted over the direct interface described above, or indirectly via one or more intermediate network nodes or functions.

2. Based on the information in the events and measurements, or information from other sources, the UE trace initiation node determines a need for one or more UE traces to be initiated. A UE trace may be started for many reasons. For example, the UE may be a target for troubleshooting, the performance level as measured by a performance metric (e.g., as determined based on the events or measurements in step 1) fails to meet a threshold and trace information is needed to determine the appropriate actions to take, or the UE requests a service requiring trace information to be monitored and controlled.

3. Based on the information in the events and measurements the UE trace initiation node deduces the location of one of more UEs of interest. For example, the identity of the NF in the events may enable the UE trace initiation node to look up the address of the NF, and so infer that the UEs of interest are connected to the NF.

Based on the correlated information in step 1, the UE trace initiation node may identify the UE and address it by transmitting to the NF.

4. The UE trace initiation node sends one or more Trace Request messages to the NFs handling or serving the UEs of concern, using the direct interface described above with respect to FIG. 1.

5. The NFs which receive the trace request message respond with a Trace Response message, e.g. with a positive or negative acknowledgement, via the direct interface. The NF may also store the UE Trace Context, which defines the configuration and parameters relating to the trace, e.g., which events/measurements are to be reported, for which UEs, etc. The UE Trace Context may be defined by data within the trace request message, as described below.

6. At a positive acknowledgement, the NF starts the requested UE Traces

7. The NFs of the RAN send event and measurement messages to the UE trace initiation node, now also comprising the requested UE Traces, via the direct interface.

Step 4 above describes the transmission of a trace request message from the UE trace initiation node to a radio access network NF. Further detail regarding the trace request message is provided below.

The trace request message may comprise a request to initiate a trace on one or more particular UEs, for example, by including identities of those UEs. The identity may comprise one or more of: C-RNTI, eNB UE S1AP ID, MME UE S1AP ID, AMF UE NGAP ID, and RAN UE NGAP ID, for example. Additionally or alternatively, the trace request message may comprise a request to initiate a trace on one or more classes of UEs. The classes may be determined by the UE trace initiation node based on an identifier such as an international mobile equipment identity (IMEI), an IMEI software version (IMEISV), single-network slice selection assistance information (S-NSSAI), radio access technology (RAT)/frequency selection priority (RFSP) index, service profile identifier (SPID) or additional radio resource management policy index (ARPI), and used to determine specific UEs which can then be identified in the trace request message(s).

The trace request message may further comprise or be associated with one or more trace identifies used to identify the particular requested trace or traces. Where the trace request message comprises multiple trace identities, respective trace identities may be provided for each UE which is to be traced. These trace identities may be used subsequently by the NF, by including them in UE trace events and measurements messages (e.g. sent in step 7 as part of the UE trace).

The trace may be local for the NF or follow the UE as it continues to roam in the network. Thus the trace request message may comprise an indication as to whether the trace is local for the NF (i.e. the trace does not need to follow the UE if it roams away from the NF), or whether the trace follows the UE as it roams. Further, the trace may be temporary in time (e.g. valid for a defined period), valid until a specific event occurs, or valid until terminated. These variables may be formulated jointly in a table, as shown in Table 1 below, where each requested trace will adhere to one row and column.

TABLE 1

Trace options

| Trace options | Valid during period | Valid until event | Valid until notice |
|---|---|---|---|
| Local to NF | | | |
| Following UE | | | |

A trace may require one or more measurements/events to be provided for the UE. Thus, the trace request message may comprise one or more indications of the measurements and/or events which are to be reported to the UE trace initiation node as part of the trace. The events and/or measurements may be grouped using a unique name, which may be requested, e.g., handover related events, events over a defined interface, or events adhering to a specific NF type, e.g. CU-CP or DU. The trace request message may also include the identity of the UE trace initiation node or node receiving the trace information elements, the address to said UE trace initiation node or node or both the identity and the address.

The measurements/events relate to both signaling messages over the interfaces, that is, between RAN NFs (such as N2, F1, E1 and Xn for 5G RAN) or external events, and signaling messages within the NF, i.e., internal events.

The trace request message may further comprise an indication of one or more start conditions for the trace. For example, the start condition may comprise one or more of: a start time for the trace; an indication that the trace should start immediately (which may be a default assumption, in the absence of any start conditions); and one or more trigger events which trigger the trace to be started. The one or more trigger events may comprise one or more of: a radio metric for the UE meeting a threshold; a radio metric for the radio access network node or function meeting a threshold; and the UE entering a particular state (e.g., such as an RRC connectivity state). It will be understood by those skilled in the art that a radio metric meeting a threshold may correspond to a radio metric exceeding or falling below that threshold, depending on the particular radio metric (i.e. whether higher values correspond to positive outcomes, or lower values), and whether the trace is to be started upon a positive or negative event.

Figure 3A:
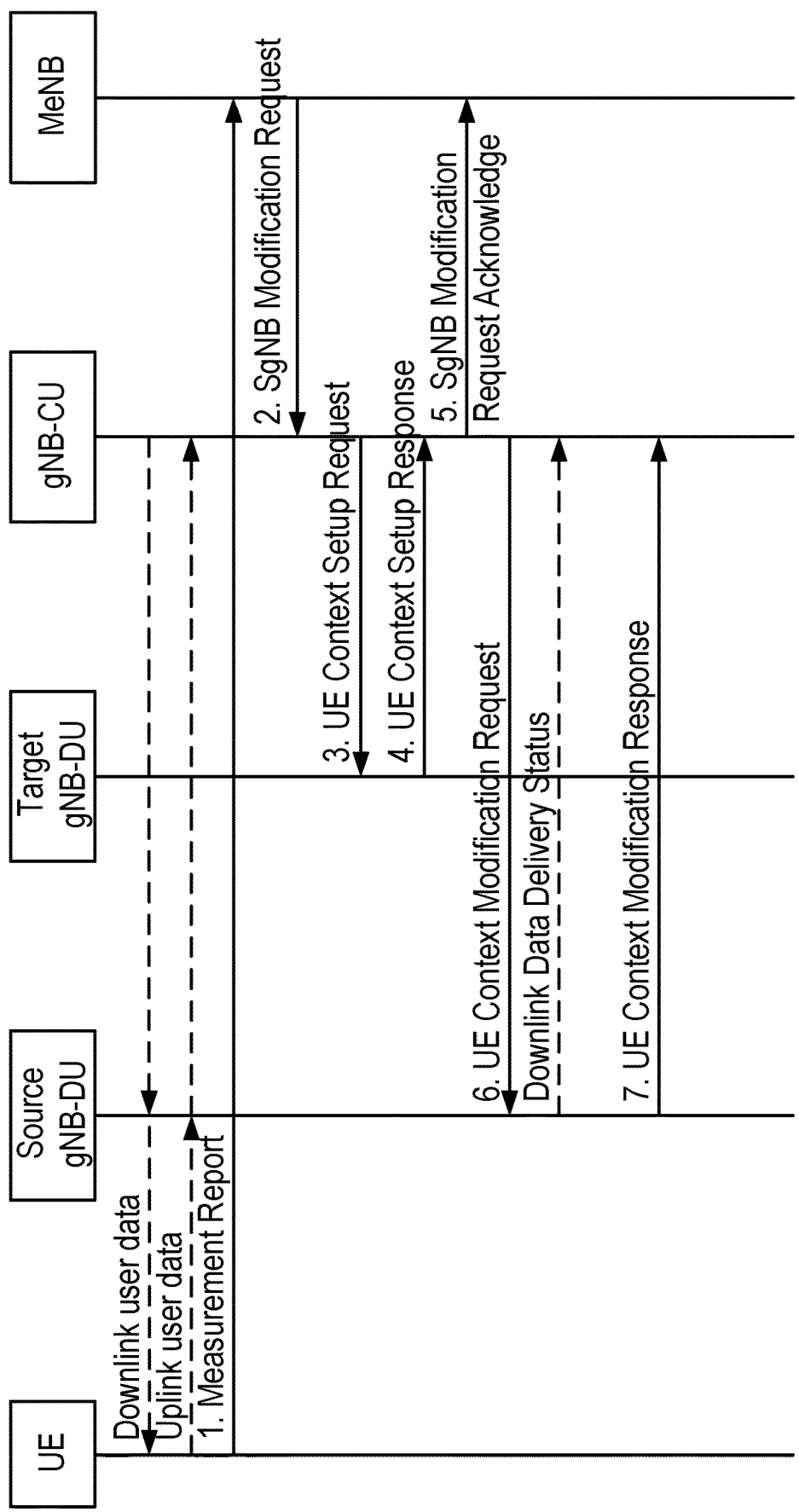
FIGS. 3a and 3b show a signalling diagram for inter-gNB-DU Mobility using MCG SRB in EN-DC in accordance with some embodiments of the disclosure.
Figure 3B:
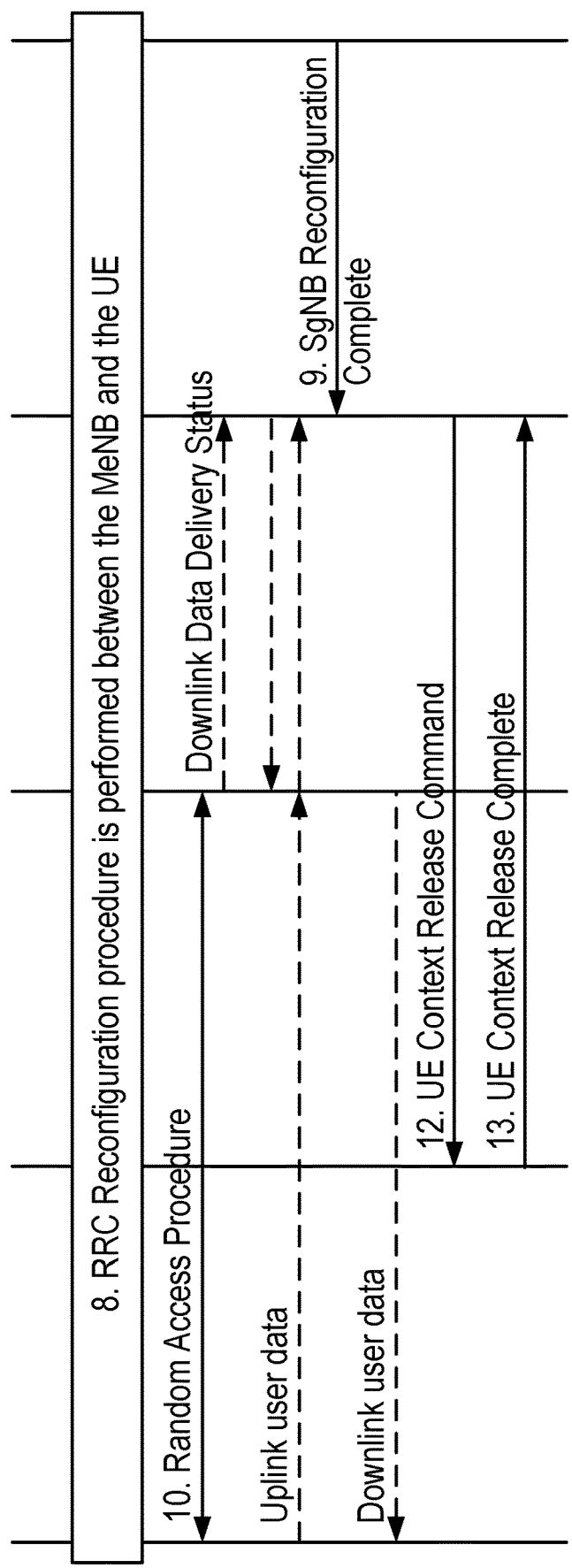
Figure 4A:
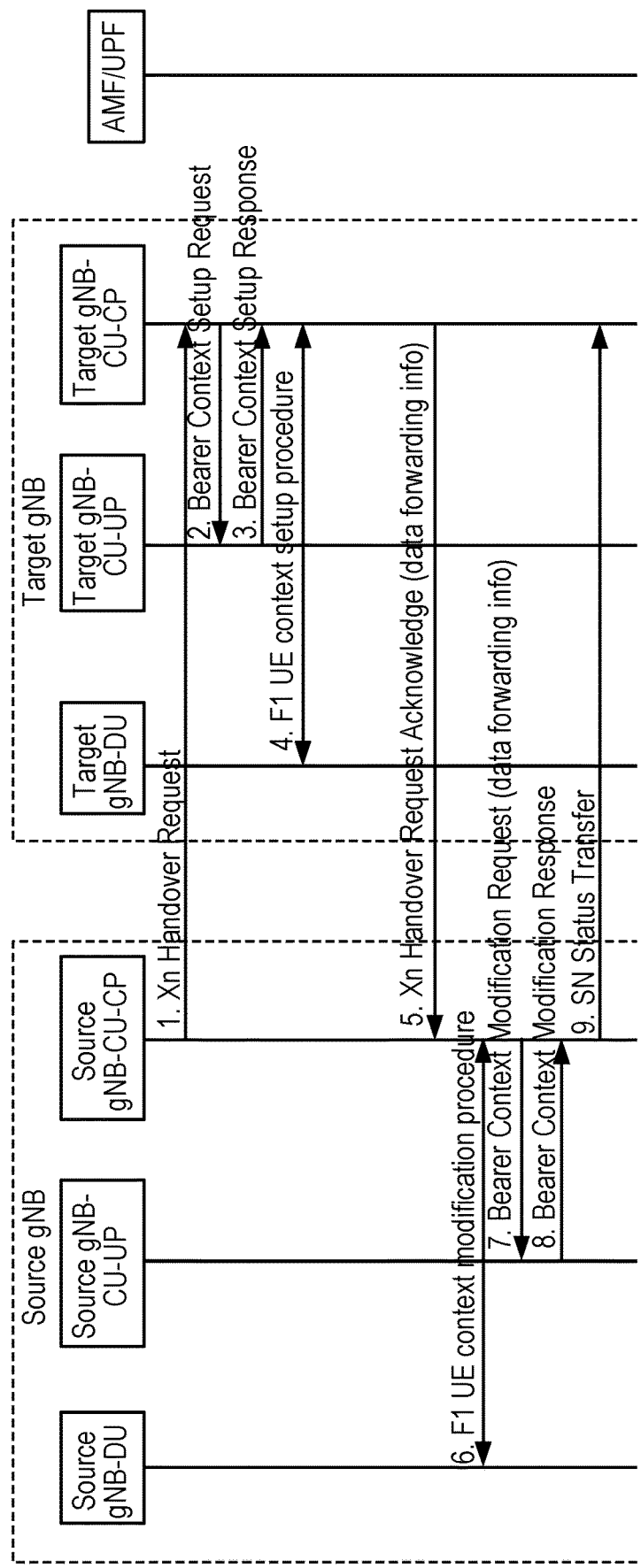
FIGS. 4a and 4b show a signalling diagram for inter-gNB handover involving gNB-CU-UP change in accordance with some embodiments of the disclosure.
Figure 4B:
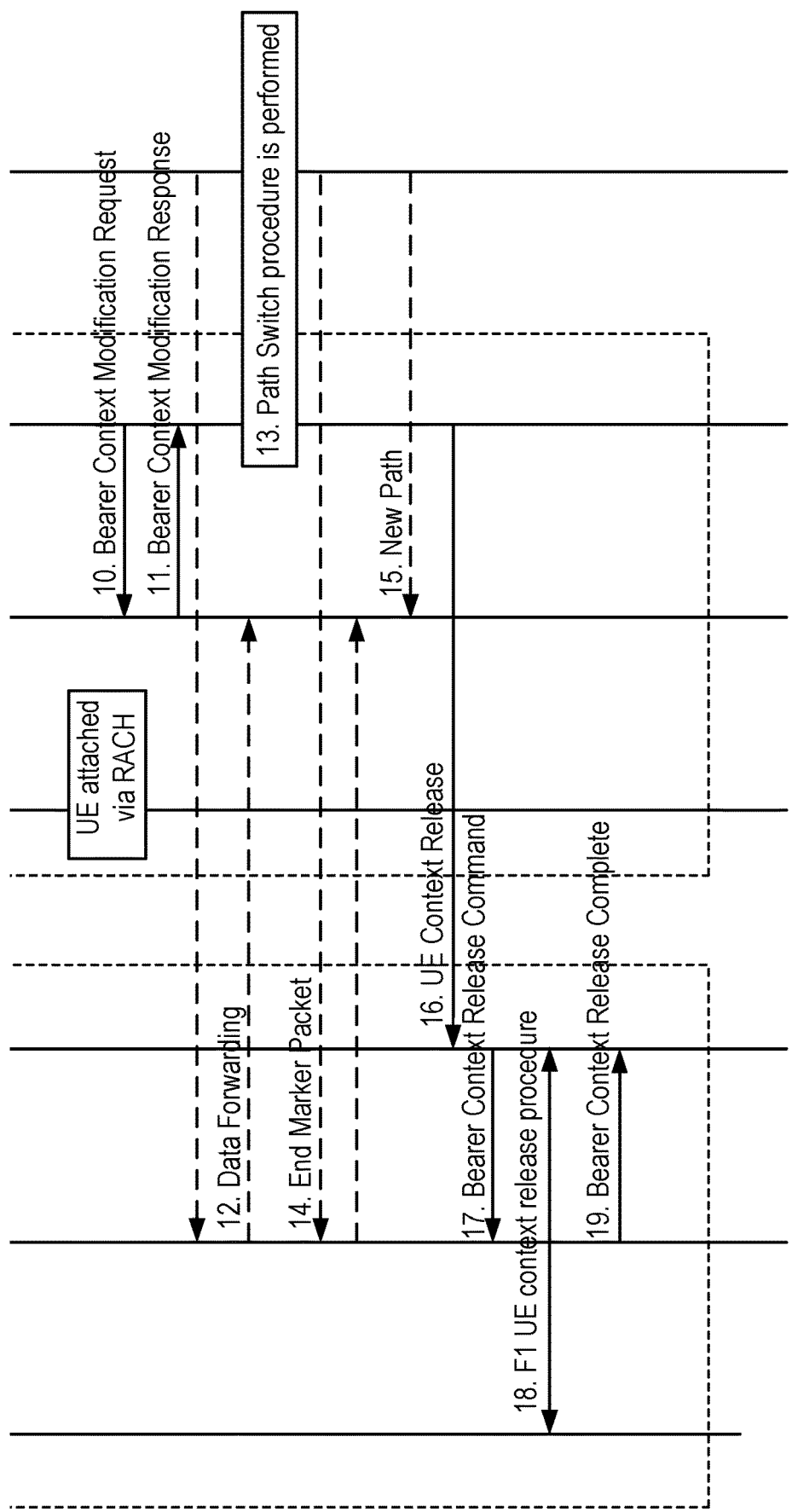

As noted above, according to some embodiments of the disclosure, a UE trace may follow the UE as it roams from one NF (e.g., the NF in which the UE Trace was initiated) to another. FIGS. 3 and 4 set out two possible scenarios for handover of the UE from one RAN NF to another. Each figure is split across two separate drawings which follow on from each other. FIGS. 3a and 3b show an embodiment in which a UE moves from one DU to another within the same base station (gNB). FIGS. 4a and 4b show an embodiment in which a UE moves from one base station (gNB) to another. The illustrated embodiment involves a change of CU-UP. The UE Trace Context, carrying the requested UE trace, may also be forwarded at mobility. In either embodiment, the target RAN network function may be configured with a start condition to initiate one or more traces. For example, the target RAN network function may be configured to initiate a trace when a particular trace identity or UE identity enters or connects to the target RAN network function. Alternatively, the target RAN network function could, e.g. at Handover Request, fetch an UE trace context, associated with the UE identity or UE trace identity, from the UE trace initiation node, where the UE trace context contains information on the trace to be initiated, i.e. the UE trace configuration.

The signaling diagram in FIGS. 3a and 3b depicts an example case where the requested UE trace is forwarded as part of a UE Trace Context at Inter-gNB-DU Mobility. In particular, the signaling diagram shows Inter-gNB-DU mobility using master cell group (MCG) signaling radio bearer (SRB) in EN-DC (E-UTRAN New Radio dual connectivity), and is described in more detail in 3GPP TS 38.401, v 15.3.0.

Here the UE Trace Context is provided in the UE Context Setup Message in step 3, whereafter the target gNB-DU may commence reporting events and measurements for the UE trace to the UE trace initiation node.

The signaling diagram in FIGS. 4a and 4b depicts an example case where the requested UE trace is forwarded as part of a UE Trace Context at Inter-gNB handover. In particular, the signaling diagram shows Inter-gNB handover involving gNB-CU-UP change, and is shown in more detail in 3GPP TS 38.401, v 15.3.0.

Here the UE Trace Context is provided in the Xn Handover Request to the target CU-CP in step 1 and forwarded to the target DU in the F1 UE Context Setup Procedure in step 4, whereafter the target CU and DU respectively may commence reporting events and measurements for the UE trace to the UE trace initiation node. The UE Trace Context may also be provided to the target CU-UP in the Bearer Context Setup Request in step 2.

Figure 5:
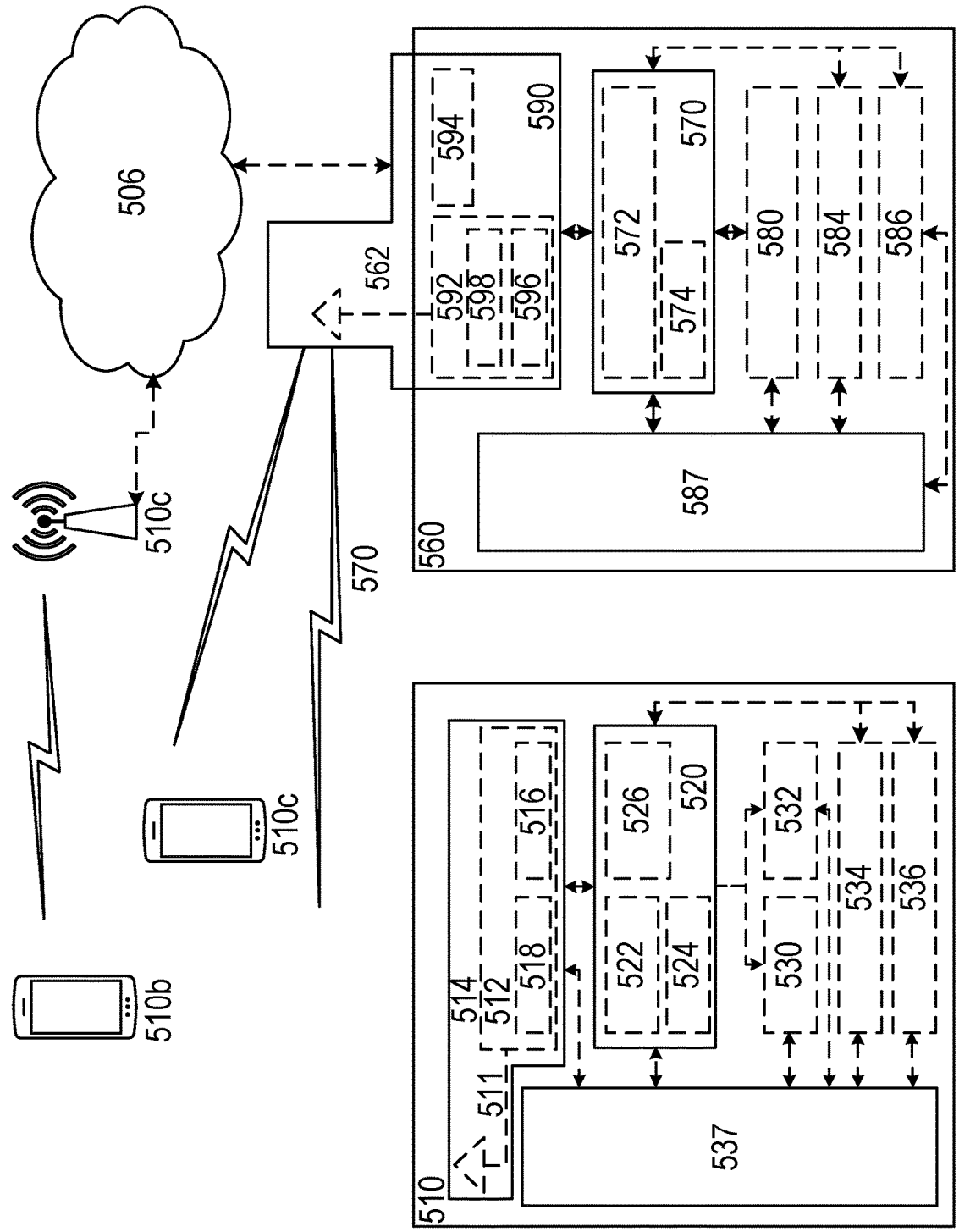
FIG. 5 shows a wireless network in accordance with some embodiments of the disclosure.

Although the subject matter described herein may be implemented in any appropriate type of system using any suitable components, the embodiments disclosed herein are described in relation to a wireless network, such as the example wireless network illustrated in FIG. 5. For simplicity, the wireless network of FIG. 5 only depicts network 506, network nodes 560 and 560b, and WDs 510, 510b, and 510c. In practice, a wireless network may further include any additional elements suitable to support communication between wireless devices or between a wireless device and another communication device, such as a landline telephone, a service provider, or any other network node or end device. Of the illustrated components, network node 560 and wireless device (WD) 510 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 506 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 560 and WD 510 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 5, network node 560 includes processing circuitry 570, device readable medium 580, interface 590, auxiliary equipment 584, power source 586, power circuitry 587, and antenna 562. Although network node 560 illustrated in the example wireless network of FIG. 5 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 560 are depicted as single boxes located within a larger box, or nested within multiple boxes, in practice, a network node may comprise multiple different physical components that make up a single illustrated component (e.g., device readable medium 580 may comprise multiple separate hard drives as well as multiple RAM modules).

Similarly, network node 560 may be composed of multiple physically separate components (e.g., a NodeB component and a RNC component, or a BTS component and a BSC component, etc.), which may each have their own respective components. In certain scenarios in which network node 560 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 560 may be configured to support multiple radio access technologies (RATs). In such embodiments, some components may be duplicated (e.g., separate device readable medium 580 for the different RATs) and some components may be reused (e.g., the same antenna 562 may be shared by the RATs). Network node 560 may also include multiple sets of the various illustrated components for different wireless technologies integrated into network node 560, such as, for example, GSM, WCDMA, LTE, NR, WiFi, or Bluetooth wireless technologies. These wireless technologies may be integrated into the same or different chip or set of chips and other components within network node 560.

Processing circuitry 570 is configured to perform any determining, calculating, or similar operations (e.g., certain obtaining operations) described herein as being provided by a network node. These operations performed by processing circuitry 570 may include processing information obtained by processing circuitry 570 by, for example, converting the obtained information into other information, comparing the obtained information or converted information to information stored in the network node, and/or performing one or more operations based on the obtained information or converted information, and as a result of said processing making a determination.

Processing circuitry 570 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 560 components, such as device readable medium 580, network node 560 functionality. For example, processing circuitry 570 may execute instructions stored in device readable medium 580 or in memory within processing circuitry 570. Such functionality may include providing any of the various wireless features, functions, or benefits discussed herein. In some embodiments, processing circuitry 570 may include a system on a chip (SOC).

In some embodiments, processing circuitry 570 may include one or more of radio frequency (RF) transceiver circuitry 572 and baseband processing circuitry 574. In some embodiments, radio frequency (RF) transceiver circuitry 572 and baseband processing circuitry 574 may be on separate chips (or sets of chips), boards, or units, such as radio units and digital units. In alternative embodiments, part or all of RF transceiver circuitry 572 and baseband processing circuitry 574 may be on the same chip or set of chips, boards, or units In certain embodiments, some or all of the functionality described herein as being provided by a network node, base station, eNB or other such network device may be performed by processing circuitry 570 executing instructions stored on device readable medium 580 or memory within processing circuitry 570. In alternative embodiments, some or all of the functionality may be provided by processing circuitry 570 without executing instructions stored on a separate or discrete device readable medium, such as in a hard-wired manner. In any of those embodiments, whether executing instructions stored on a device readable storage medium or not, processing circuitry 570 can be configured to perform the described functionality. The benefits provided by such functionality are not limited to processing circuitry 570 alone or to other components of network node 560, but are enjoyed by network node 560 as a whole, and/or by end users and the wireless network generally.

Device readable medium 580 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 570. Device readable medium 580 may store any suitable instructions, data or information, including a computer program, software, an application including one or more of logic, rules, code, tables, etc. and/or other instructions capable of being executed by processing circuitry 570 and, utilized by network node 560. Device readable medium 580 may be used to store any calculations made by processing circuitry 570 and/or any data received via interface 590. In some embodiments, processing circuitry 570 and device readable medium 580 may be considered to be integrated.

Interface 590 is used in the wired or wireless communication of signalling and/or data between network node 560, network 506, and/or WDs 510. As illustrated, interface 590 comprises port(s)/terminal(s) 594 to send and receive data, for example to and from network 506 over a wired connection. Interface 590 also includes radio front end circuitry 592 that may be coupled to, or in certain embodiments a part of, antenna 562. Radio front end circuitry 592 comprises filters 598 and amplifiers 596. Radio front end circuitry 592 may be connected to antenna 562 and processing circuitry 570. Radio front end circuitry may be configured to condition signals communicated between antenna 562 and processing circuitry 570. Radio front end circuitry 592 may receive digital data that is to be sent out to other network nodes or WDs via a wireless connection. Radio front end circuitry 592 may convert the digital data into a radio signal having the appropriate channel and bandwidth parameters using a combination of filters 598 and/or amplifiers 596. The radio signal may then be transmitted via antenna 562. Similarly, when receiving data, antenna 562 may collect radio signals which are then converted into digital data by radio front end circuitry 592. The digital data may be passed to processing circuitry 570. In other embodiments, the interface may comprise different components and/or different combinations of components.

In certain alternative embodiments, network node 560 may not include separate radio front end circuitry 592, instead, processing circuitry 570 may comprise radio front end circuitry and may be connected to antenna 562 without separate radio front end circuitry 592. Similarly, in some embodiments, all or some of RF transceiver circuitry 572 may be considered a part of interface 590. In still other embodiments, interface 590 may include one or more ports or terminals 594, radio front end circuitry 592, and RF transceiver circuitry 572, as part of a radio unit (not shown), and interface 590 may communicate with baseband processing circuitry 574, which is part of a digital unit (not shown).

Antenna 562 may include one or more antennas, or antenna arrays, configured to send and/or receive wireless signals. Antenna 562 may be coupled to radio front end circuitry 590 and may be any type of antenna capable of transmitting and receiving data and/or signals wirelessly. In some embodiments, antenna 562 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 562 may be separate from network node 560 and may be connectable to network node 560 through an interface or port.

Antenna 562, interface 590, and/or processing circuitry 570 may be configured to perform any receiving operations and/or certain obtaining operations described herein as being performed by a network node. Any information, data and/or signals may be received from a wireless device, another network node and/or any other network equipment. Similarly, antenna 562, interface 590, and/or processing circuitry 570 may be configured to perform any transmitting operations described herein as being performed by a network node. Any information, data and/or signals may be transmitted to a wireless device, another network node and/or any other network equipment.

Power circuitry 587 may comprise, or be coupled to, power management circuitry and is configured to supply the components of network node 560 with power for performing the functionality described herein. Power circuitry 587 may receive power from power source 586. Power source 586 and/or power circuitry 587 may be configured to provide power to the various components of network node 560 in a form suitable for the respective components (e.g., at a voltage and current level needed for each respective component). Power source 586 may either be included in, or external to, power circuitry 587 and/or network node 560. For example, network node 560 may be connectable to an external power source (e.g., an electricity outlet) via an input circuitry or interface such as an electrical cable, whereby the external power source supplies power to power circuitry 587. As a further example, power source 586 may comprise a source of power in the form of a battery or battery pack which is connected to, or integrated in, power circuitry 587. The battery may provide backup power should the external power source fail. Other types of power sources, such as photovoltaic devices, may also be used.

Alternative embodiments of network node 560 may include additional components beyond those shown in FIG. 5 that may be responsible for providing certain aspects of the network node's functionality, including any of the functionality described herein and/or any functionality necessary to support the subject matter described herein. For example, network node 560 may include user interface equipment to allow input of information into network node 560 and to allow output of information from network node 560. This may allow a user to perform diagnostic, maintenance, repair, and other administrative functions for network node 560.

According to embodiments of the disclosure, and as noted above, network node 560 is implemented into at least two component parts, such as two or more of: one or more central units (CUs); one or more distributed units (DUs); and one or more radio units (RUs). The CU may be further split into one or more user-plane entities or functions (CU-UP) and one or more control-plane entities or functions (CU-CP). The protocol layer stack of the base station is divided between the CU, the DUs and the RUs, with one or more lower layers of the stack implemented in the RUs, and one or more higher layers of the stack implemented in the CU and/or DU. The CU may be coupled to the DUs via a fronthaul higher layer split (HLS) network; the CU/DUs may be connected to the RUs via a fronthaul lower-layer split (LLS) network.

The CU, the DU and the RU may each comprise processing circuitry which is configured to perform any of the methods described herein, such as those described below with respect to FIG. 10. The CU, the DU and/or the RU may further comprise power supply circuitry configured to supply power to the respective CU, DU and RU.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (Vol P) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 510 includes antenna 511, interface 514, processing circuitry 520, device readable medium 530, user interface equipment 532, auxiliary equipment 534, power source 536 and power circuitry 537. WD 510 may include multiple sets of one or more of the illustrated components for different wireless technologies supported by WD 510, such as, for example, GSM, WCDMA, LTE, NR, WiFi, WiMAX, or Bluetooth wireless technologies, just to mention a few. These wireless technologies may be integrated into the same or different chips or set of chips as other components within WD 510.

Antenna 511 may include one or more antennas or antenna arrays, configured to send and/or receive wireless signals, and is connected to interface 514. In certain alternative embodiments, antenna 511 may be separate from WD 510 and be connectable to WD 510 through an interface or port. Antenna 511, interface 514, and/or processing circuitry 520 may be configured to perform any receiving or transmitting operations described herein as being performed by a WD. Any information, data and/or signals may be received from a network node and/or another WD. In some embodiments, radio front end circuitry and/or antenna 511 may be considered an interface.

As illustrated, interface 514 comprises radio front end circuitry 512 and antenna 511. Radio front end circuitry 512 comprise one or more filters 518 and amplifiers 516. Radio front end circuitry 514 is connected to antenna 511 and processing circuitry 520, and is configured to condition signals communicated between antenna 511 and processing circuitry 520. Radio front end circuitry 512 may be coupled to or a part of antenna 511. In some embodiments, WD 510 may not include separate radio front end circuitry 512; rather, processing circuitry 520 may comprise radio front end circuitry and may be connected to antenna 511. Similarly, in some embodiments, some or all of RF transceiver circuitry 522 may be considered a part of interface 514. Radio front end circuitry 512 may receive digital data that is to be sent out to other network nodes or WDs via a wireless connection. Radio front end circuitry 512 may convert the digital data into a radio signal having the appropriate channel and bandwidth parameters using a combination of filters 518 and/or amplifiers 516. The radio signal may then be transmitted via antenna 511. Similarly, when receiving data, antenna 511 may collect radio signals which are then converted into digital data by radio front end circuitry 512. The digital data may be passed to processing circuitry 520. In other embodiments, the interface may comprise different components and/or different combinations of components.

Processing circuitry 520 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 510 components, such as device readable medium 530, WD 510 functionality. Such functionality may include providing any of the various wireless features or benefits discussed herein. For example, processing circuitry 520 may execute instructions stored in device readable medium 530 or in memory within processing circuitry 520 to provide the functionality disclosed herein.

As illustrated, processing circuitry 520 includes one or more of RF transceiver circuitry 522, baseband processing circuitry 524, and application processing circuitry 526. In other embodiments, the processing circuitry may comprise different components and/or different combinations of components. In certain embodiments processing circuitry 520 of WD 510 may comprise a SOC. In some embodiments, RF transceiver circuitry 522, baseband processing circuitry 524, and application processing circuitry 526 may be on separate chips or sets of chips. In alternative embodiments, part or all of baseband processing circuitry 524 and application processing circuitry 526 may be combined into one chip or set of chips, and RF transceiver circuitry 522 may be on a separate chip or set of chips. In still alternative embodiments, part or all of RF transceiver circuitry 522 and baseband processing circuitry 524 may be on the same chip or set of chips, and application processing circuitry 526 may be on a separate chip or set of chips. In yet other alternative embodiments, part or all of RF transceiver circuitry 522, baseband processing circuitry 524, and application processing circuitry 526 may be combined in the same chip or set of chips. In some embodiments, RF transceiver circuitry 522 may be a part of interface 514. RF transceiver circuitry 522 may condition RF signals for processing circuitry 520.

In certain embodiments, some or all of the functionality described herein as being performed by a WD may be provided by processing circuitry 520 executing instructions stored on device readable medium 530, which in certain embodiments may be a computer-readable storage medium. In alternative embodiments, some or all of the functionality may be provided by processing circuitry 520 without executing instructions stored on a separate or discrete device readable storage medium, such as in a hard-wired manner. In any of those particular embodiments, whether executing instructions stored on a device readable storage medium or not, processing circuitry 520 can be configured to perform the described functionality. The benefits provided by such functionality are not limited to processing circuitry 520 alone or to other components of WD 510, but are enjoyed by WD 510 as a whole, and/or by end users and the wireless network generally.

Processing circuitry 520 may be configured to perform any determining, calculating, or similar operations (e.g., certain obtaining operations) described herein as being performed by a WD. These operations, as performed by processing circuitry 520, may include processing information obtained by processing circuitry 520 by, for example, converting the obtained information into other information, comparing the obtained information or converted information to information stored by WD 510, and/or performing one or more operations based on the obtained information or converted information, and as a result of said processing making a determination.

Device readable medium 530 may be operable to store a computer program, software, an application including one or more of logic, rules, code, tables, etc. and/or other instructions capable of being executed by processing circuitry 520. Device readable medium 530 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 520. In some embodiments, processing circuitry 520 and device readable medium 530 may be considered to be integrated.

User interface equipment 532 may provide components that allow for a human user to interact with WD 510. Such interaction may be of many forms, such as visual, audial, tactile, etc. User interface equipment 532 may be operable to produce output to the user and to allow the user to provide input to WD 510. The type of interaction may vary depending on the type of user interface equipment 532 installed in WD 510. For example, if WD 510 is a smart phone, the interaction may be via a touch screen; if WD 510 is a smart meter, the interaction may be through a screen that provides usage (e.g., the number of gallons used) or a speaker that provides an audible alert (e.g., if smoke is detected). User interface equipment 532 may include input interfaces, devices and circuits, and output interfaces, devices and circuits. User interface equipment 532 is configured to allow input of information into WD 510, and is connected to processing circuitry 520 to allow processing circuitry 520 to process the input information. User interface equipment 532 may include, for example, a microphone, a proximity or other sensor, keys/buttons, a touch display, one or more cameras, a USB port, or other input circuitry. User interface equipment 532 is also configured to allow output of information from WD 510, and to allow processing circuitry 520 to output information from WD 510. User interface equipment 532 may include, for example, a speaker, a display, vibrating circuitry, a USB port, a headphone interface, or other output circuitry. Using one or more input and output interfaces, devices, and circuits, of user interface equipment 532, WD 510 may communicate with end users and/or the wireless network, and allow them to benefit from the functionality described herein.

Auxiliary equipment 534 is operable to provide more specific functionality which may not be generally performed by WDs. This may comprise specialized sensors for doing measurements for various purposes, interfaces for additional types of communication such as wired communications etc. The inclusion and type of components of auxiliary equipment 534 may vary depending on the embodiment and/or scenario.

Power source 536 may, in some embodiments, be in the form of a battery or battery pack. Other types of power sources, such as an external power source (e.g., an electricity outlet), photovoltaic devices or power cells, may also be used. WD 510 may further comprise power circuitry 537 for delivering power from power source 536 to the various parts of WD 510 which need power from power source 536 to carry out any functionality described or indicated herein. Power circuitry 537 may in certain embodiments comprise power management circuitry. Power circuitry 537 may additionally or alternatively be operable to receive power from an external power source; in which case WD 510 may be connectable to the external power source (such as an electricity outlet) via input circuitry or an interface such as an electrical power cable. Power circuitry 537 may also in certain embodiments be operable to deliver power from an external power source to power source 536. This may be, for example, for the charging of power source 536. Power circuitry 537 may perform any formatting, converting, or other modification to the power from power source 536 to make the power suitable for the respective components of WD 510 to which power is supplied.

Figure 6:
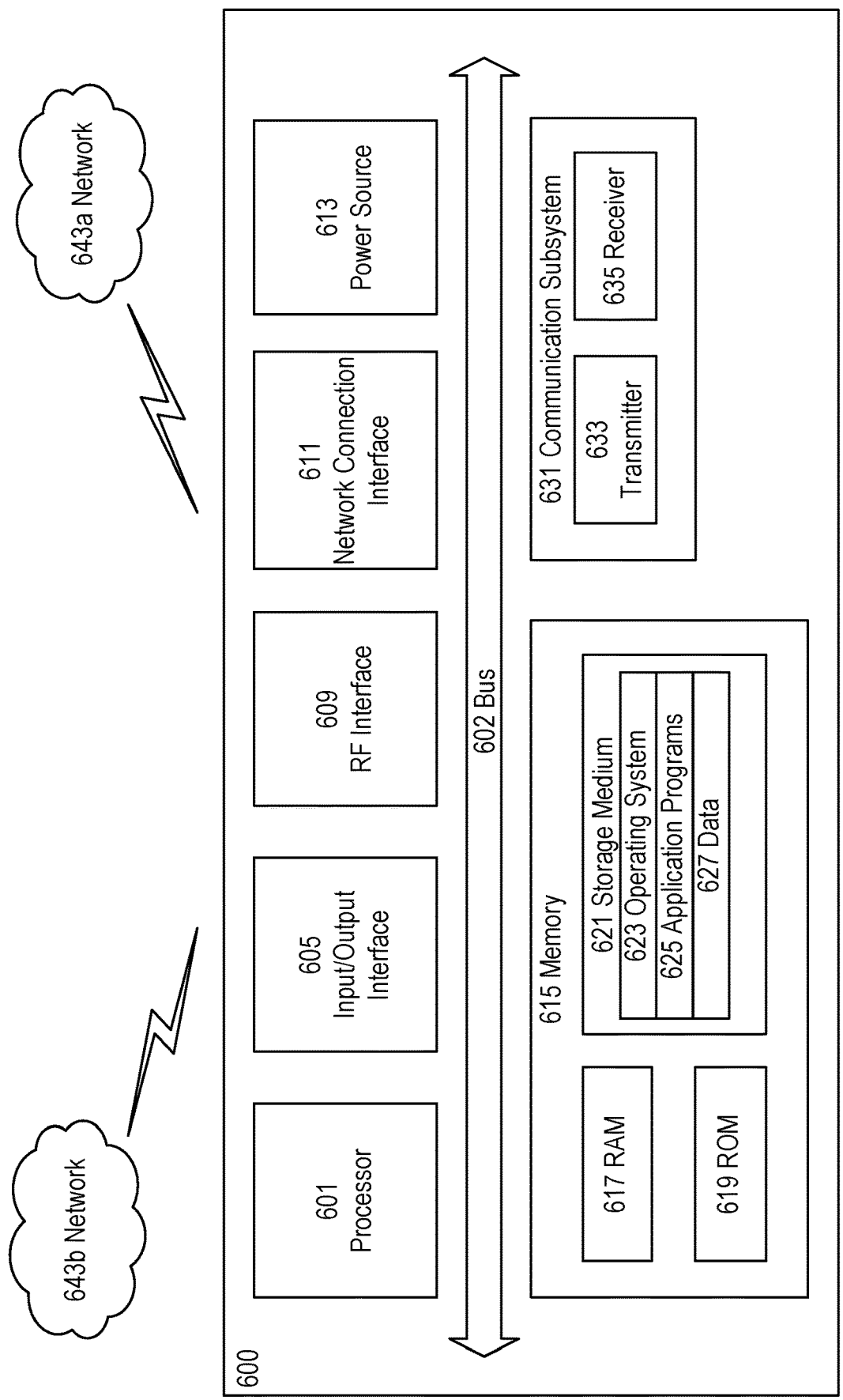
FIG. 6 shows a user equipment in accordance with some embodiments of the disclosure.

FIG. 6 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 6200 may be any UE identified by the $3^{rd}$ Generation Partnership Project (3GPP), including a NB-IoT UE, a machine type communication (MTC) UE, and/or an enhanced MTC (eMTC) UE. UE 600, as illustrated in FIG. 6, is one example of a WD configured for communication in accordance with one or more communication standards promulgated by the $3^{rd}$ Generation Partnership Project (3GPP), such as 3GPP's GSM, UMTS, LTE, and/or 5G standards. As mentioned previously, the term WD and UE may be used interchangeable. Accordingly, although FIG. 6 is a UE, the components discussed herein are equally applicable to a WD, and vice-versa.

In FIG. 6, UE 600 includes processing circuitry 601 that is operatively coupled to input/output interface 605, radio frequency (RF) interface 609, network connection interface 611, memory 615 including random access memory (RAM) 617, read-only memory (ROM) 619, and storage medium 621 or the like, communication subsystem 631, power source 633, and/or any other component, or any combination thereof. Storage medium 621 includes operating system 623, application program 625, and data 627. In other embodiments, storage medium 621 may include other similar types of information. Certain UEs may utilize all of the components shown in FIG. 6, or only a subset of the components. The level of integration between the components may vary from one UE to another UE. Further, certain UEs may contain multiple instances of a component, such as multiple processors, memories, transceivers, transmitters, receivers, etc.

In FIG. 6, processing circuitry 601 may be configured to process computer instructions and data. Processing circuitry 601 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 601 may include two central processing units (CPUs). Data may be information in a form suitable for use by a computer.

In the depicted embodiment, input/output interface 605 may be configured to provide a communication interface to an input device, output device, or input and output device. UE 600 may be configured to use an output device via input/output interface 605. An output device may use the same type of interface port as an input device. For example, a USB port may be used to provide input to and output from UE 600. The output device may be a speaker, a sound card, a video card, a display, a monitor, a printer, an actuator, an emitter, a smartcard, another output device, or any combination thereof. UE 600 may be configured to use an input device via input/output interface 605 to allow a user to capture information into UE 600. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 6, RF interface 609 may be configured to provide a communication interface to RF components such as a transmitter, a receiver, and an antenna. Network connection interface 611 may be configured to provide a communication interface to network 643a. Network 643a may encompass wired and/or wireless networks such as a local-area network (LAN), a wide-area network (WAN), a computer network, a wireless network, a telecommunications network, another like network or any combination thereof. For example, network 643a may comprise a Wi-Fi network. Network connection interface 611 may be configured to include a receiver and a transmitter interface used to communicate with one or more other devices over a communication network according to one or more communication protocols, such as Ethernet, TCP/IP, SONET, ATM, or the like. Network connection interface 611 may implement receiver and transmitter functionality appropriate to the communication network links (e.g., optical, electrical, and the like). The transmitter and receiver functions may share circuit components, software or firmware, or alternatively may be implemented separately.

RAM 617 may be configured to interface via bus 602 to processing circuitry 601 to provide storage or caching of data or computer instructions during the execution of software programs such as the operating system, application programs, and device drivers. ROM 619 may be configured to provide computer instructions or data to processing circuitry 601. For example, ROM 619 may be configured to store invariant low-level system code or data for basic system functions such as basic input and output (I/O), startup, or reception of keystrokes from a keyboard that are stored in a non-volatile memory. Storage medium 621 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 621 may be configured to include operating system 623, application program 625 such as a web browser application, a widget or gadget engine or another application, and data file 627. Storage medium 621 may store, for use by UE 600, any of a variety of various operating systems or combinations of operating systems.

Storage medium 621 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 621 may allow UE 600 to access computer-executable instructions, application programs or the like, stored on transitory or non-transitory memory media, to off-load data, or to upload data. An article of manufacture, such as one utilizing a communication system may be tangibly embodied in storage medium 621, which may comprise a device readable medium.

In FIG. 6, processing circuitry 601 may be configured to communicate with network 643b using communication subsystem 631. Network 643a and network 643b may be the same network or networks or different network or networks. Communication subsystem 631 may be configured to include one or more transceivers used to communicate with network 643b. For example, communication subsystem 631 may be configured to include one or more transceivers used to communicate with one or more remote transceivers of another device capable of wireless communication such as another WD, UE, or base station of a radio access network (RAN) according to one or more communication protocols, such as IEEE 802.11, CDMA, WCDMA, GSM, LTE, UTRAN, WiMax, or the like. Each transceiver may include transmitter 633 and/or receiver 635 to implement transmitter or receiver functionality, respectively, appropriate to the RAN links (e.g., frequency allocations and the like). Further, transmitter 633 and receiver 635 of each transceiver may share circuit components, software or firmware, or alternatively may be implemented separately.

In the illustrated embodiment, the communication functions of communication subsystem 631 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 631 may include cellular communication, Wi-Fi communication, Bluetooth communication, and GPS communication. Network 643b may encompass wired and/or wireless networks such as a local-area network (LAN), a wide-area network (WAN), a computer network, a wireless network, a telecommunications network, another like network or any combination thereof. For example, network 643b may be a cellular network, a Wi-Fi network, and/or a near-field network. Power source 613 may be configured to provide alternating current (AC) or direct current (DC) power to components of UE 600.

The features, benefits and/or functions described herein may be implemented in one of the components of UE 600 or partitioned across multiple components of UE 600. Further, the features, benefits, and/or functions described herein may be implemented in any combination of hardware, software or firmware. In one example, communication subsystem 631 may be configured to include any of the components described herein. Further, processing circuitry 601 may be configured to communicate with any of such components over bus 602. In another example, any of such components may be represented by program instructions stored in memory that when executed by processing circuitry 601 perform the corresponding functions described herein. In another example, the functionality of any of such components may be partitioned between processing circuitry 601 and communication subsystem 631. In another example, the non-computationally intensive functions of any of such components may be implemented in software or firmware and the computationally intensive functions may be implemented in hardware.

Figure 7:
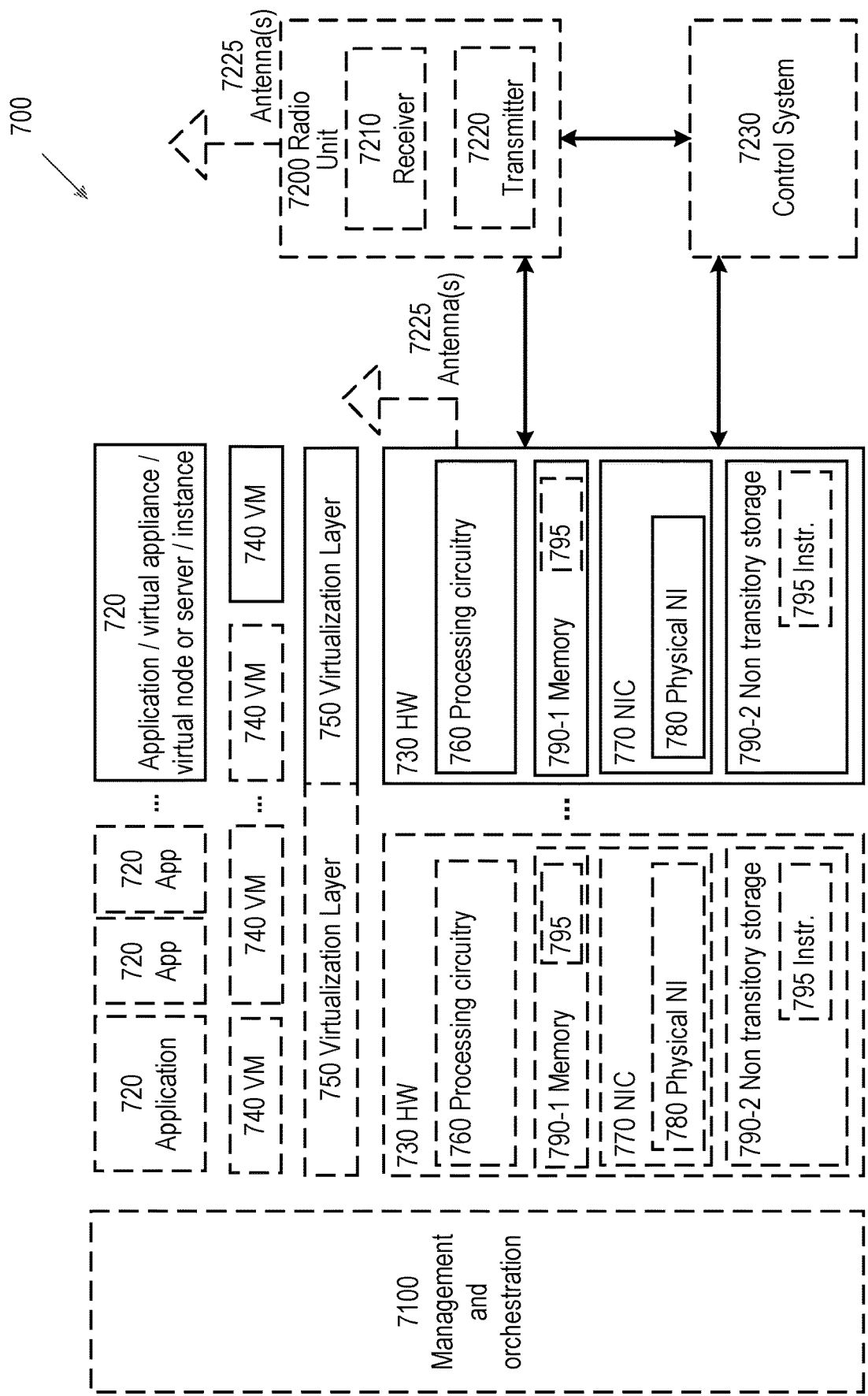
FIG. 7 shows a virtualization environment in accordance with some embodiments of the disclosure.

FIG. 7 is a schematic block diagram illustrating a virtualization environment 700 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 700 hosted by one or more of hardware nodes 730. Further, in embodiments in which the virtual node is not a radio access node or does not require radio connectivity (e.g., a core network node), then the network node may be entirely virtualized.

The functions may be implemented by one or more applications 720 (which may alternatively be called software instances, virtual appliances, network functions, virtual nodes, virtual network functions, etc.) operative to implement some of the features, functions, and/or benefits of some of the embodiments disclosed herein. Applications 720 are run in virtualization environment 700 which provides hardware 730 comprising processing circuitry 760 and memory 790. Memory 790 contains instructions 795 executable by processing circuitry 760 whereby application 720 is operative to provide one or more of the features, benefits, and/or functions disclosed herein.

Virtualization environment 700, comprises general-purpose or special-purpose network hardware devices 730 comprising a set of one or more processors or processing circuitry 760, which may be commercial off-the-shelf (COTS) processors, dedicated Application Specific Integrated Circuits (ASICs), or any other type of processing circuitry including digital or analog hardware components or special purpose processors. Each hardware device may comprise memory 790-1 which may be non-persistent memory for temporarily storing instructions 795 or software executed by processing circuitry 760. Each hardware device may comprise one or more network interface controllers (NICs) 770, also known as network interface cards, which include physical network interface 780. Each hardware device may also include non-transitory, persistent, machine-readable storage media 790-2 having stored therein software 795 and/or instructions executable by processing circuitry 760. Software 795 may include any type of software including software for instantiating one or more virtualization layers 750 (also referred to as hypervisors), software to execute virtual machines 740 as well as software allowing it to execute functions, features and/or benefits described in relation with some embodiments described herein.

Virtual machines 740, comprise virtual processing, virtual memory, virtual networking or interface and virtual storage, and may be run by a corresponding virtualization layer 750 or hypervisor. Different embodiments of the instance of virtual appliance 720 may be implemented on one or more of virtual machines 740, and the implementations may be made in different ways.

During operation, processing circuitry 760 executes software 795 to instantiate the hypervisor or virtualization layer 750, which may sometimes be referred to as a virtual machine monitor (VMM). Virtualization layer 750 may present a virtual operating platform that appears like networking hardware to virtual machine 740.

As shown in FIG. 7, hardware 730 may be a standalone network node with generic or specific components. Hardware 730 may comprise antenna 7225 and may implement some functions via virtualization. Alternatively, hardware 730 may be part of a larger cluster of hardware (e.g. such as in a data center or customer premise equipment (CPE)) where many hardware nodes work together and are managed via management and orchestration (MANO) 7100, which, among others, oversees lifecycle management of applications 720.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine 740 may be a software implementation of a physical machine that runs programs as if they were executing on a physical, non-virtualized machine. Each of virtual machines 740, and that part of hardware 730 that executes that virtual machine, be it hardware dedicated to that virtual machine and/or hardware shared by that virtual machine with others of the virtual machines 740, forms a separate virtual network elements (VNE).

Still in the context of NFV, Virtual Network Function (VNF) is responsible for handling specific network functions that run in one or more virtual machines 740 on top of hardware networking infrastructure 730 and corresponds to application 720 in FIG. 7.

In some embodiments, one or more radio units 7200 that each include one or more transmitters 7220 and one or more receivers 7210 may be coupled to one or more antennas 7225. Radio units 7200 may communicate directly with hardware nodes 730 via one or more appropriate network interfaces and may be used in combination with the virtual components to provide a virtual node with radio capabilities, such as a radio access node or a base station.

In some embodiments, some signalling can be effected with the use of control system 7230 which may alternatively be used for communication between the hardware nodes 730 and radio units 7200.

Figure 8:
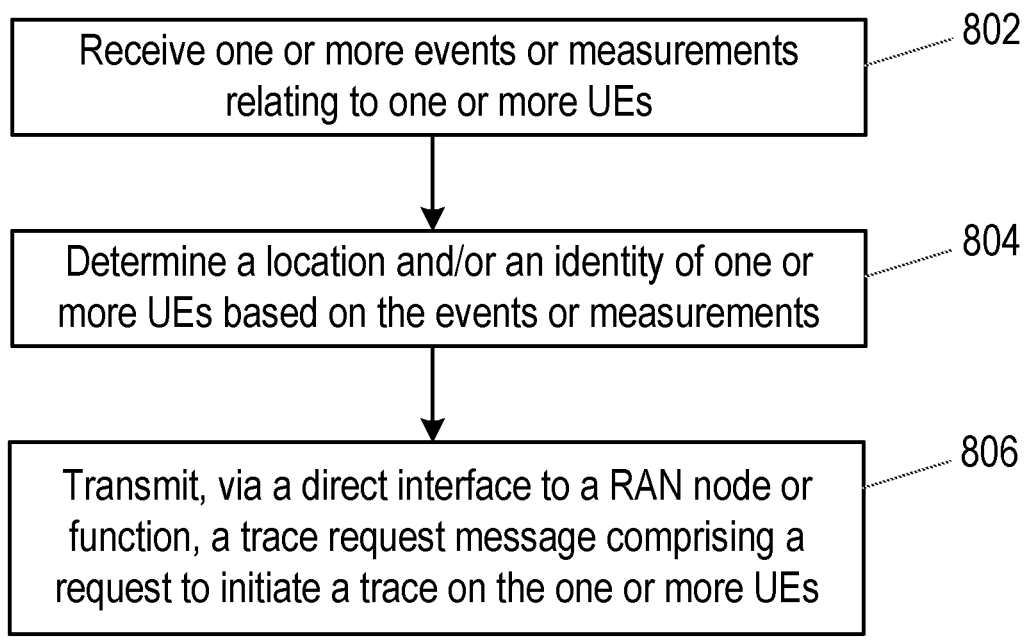
FIG. 8 is a flowchart showing a method in accordance with some embodiments of the disclosure.

FIG. 8 depicts a method in accordance with particular embodiments. The method may be performed by a UE trace initiation node or function (such as the management node, function or system described above with respect to FIGS. 1 and 2). The method of FIG. 8 may correspond in some respects to the signalling of the UE trace initiation node or management system in FIG. 2, for example.

The method begins at step 802, in which the UE trace initiation node receives one or more events or measurements relating to one or more UEs. These may comprise UE- and network-related events and measurements used for regular monitoring of one or more performance metrics, such as one or more of: accessibility, retainability and integrity. The UE trace initiation node may correlate local identities of UEs in a NF (i.e. identities for the UE used in the radio access network, such as one or more of: cell radio network temporary identifier (C-RNTI), eNB UE S1AP ID, MME UE S1AP ID, AMF UE NGAP ID, RAN UE NGAP ID), provided by events from one or more RAN NFs, with their core network counterparts such as international mobile subscriber identity (IMSI) or subscriber identity, provided by one or more core network nodes, e.g. HSS, UDM, MME and/or AMF.

In step 804, the UE trace initiation node determines a location and/or an identity of the one or more UEs based on the events or measurements received in step 802. For example, the identity of the NF in the events may enable the UE trace initiation node to look up the address of the NF, and so infer that the UEs of interest are connected to the NF. Based on the correlated information in step 802, the UE trace initiation node may identify the UE and address it by transmitting to the NF.

A UE trace may be started for many reasons. For example, the UE may be a target for troubleshooting, the performance level as measured by a performance metric (e.g., as determined based on the events or measurements in step 802) fails to meet a threshold and trace information is needed to determine the appropriate actions to take, or the UE requests a service requiring trace information to be monitored and controlled. In step 806, the UE trace initiation node transmits, via a direct interface to a RAN node or function (such as the NF identified in step 804), a trace request message comprising a request to initiate a trace on the one or more UEs.

The trace request message may comprise a request to initiate a trace on one or more particular UEs, for example, by including identities of those UEs. The identity may comprise one or more of: C-RNTI, eNB UE S1 AP ID, MME UE S1 AP ID, AMF UE NGAP ID, and RAN UE NGAP ID, for example. Additionally or alternatively, the trace request message may comprise a request to initiate a trace on one or more classes of UEs. The classes may be determined by the UE trace initiation node based on an identifier such as an international mobile equipment identity, IMEI, or an IMEI software version, IMEISV, and used to determine specific UEs which can then be identified in the trace request message(s).

The trace request message may further comprise or be associated with one or more trace identifies used to identify the particular requested trace or traces. Where the trace request message comprises multiple trace identities, respective trace identities may be provided for each UE which is to be traced. These trace identities may be used subsequently by the NF, by including them in messages reporting UE trace events and measurements.

The trace may be local for the NF or follow the UE as it continues to roam in the network. Thus, the trace request message may comprise an indication as to whether the trace is local for the NF (i.e. the trace does not need to follow the UE if it roams away from the NF), or whether the trace follows the UE as it roams. Further, the trace may be temporary in time (e.g. valid for a defined period), valid until a specific event occurs, or valid until terminated. These variables may be formulated jointly in a table, as shown in Table 2 below, where each requested trace will adhere to one row and column.

TABLE 2

Trace options

| Trace options | Valid during period | Valid until event | Valid until notice |
|---|---|---|---|
| Local to NF | | | |
| Following UE | | | |

A trace may require one or more measurements/events to be provided for the UE. Thus, the trace request message may comprise one or more indications of the measurements and/or events which are to be reported to the UE trace initiation node as part of the trace. The events and/or measurements may be grouped using a unique name, which may be requested, e.g., handover related events, events over a defined interface, or events adhering to a specific NF type, e.g. CU-CP or DU.

The measurements/events relate to both signaling messages over the interfaces, that is, between RAN NFs (such as N2, F1, E1 and Xn for 5G RAN) or external events, and signaling messages within the NF, i.e., internal events.

The trace request message may further comprise an indication of one or more start conditions for the trace. For example, the start condition may comprise one or more of: a start time for the trace; an indication that the trace should start immediately (which may be a default assumption, in the absence of any start conditions); and one or more trigger events which trigger the trace to be started. The one or more trigger events may comprise one or more of: a radio metric for the UE meeting a threshold; a radio metric for the radio access network node or function meeting a threshold; and the UE entering a particular state (e.g., such as an RRC connectivity state). It will be understood by those skilled in the art that a radio metric meeting a threshold may correspond to a radio metric exceeding or falling below that threshold, depending on the particular radio metric (i.e. whether higher values correspond to positive outcomes, or lower values), and whether the trace is to be started upon a positive or negative event.

Thereafter, the UE trace initiation node may receive events and messages from the radio access network node (or other RAN nodes to which the UE trace context is provided) as part of the UE trace on the one or more UEs.

Figure 9:
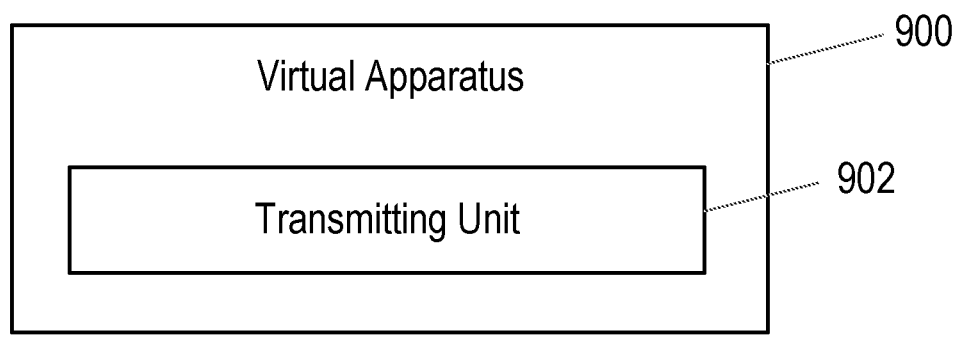
FIG. 9 shows a virtualization apparatus in accordance with some embodiments of the disclosure.

FIG. 9 illustrates a schematic block diagram of an apparatus 900 in a wireless network (for example, the wireless network shown in FIG. 5). The apparatus may be implemented in a UE trace initiation node or function, such as a management node, function or system as shown above in FIGS. 1 and 2. Apparatus 900 is operable to carry out the example method described with reference to FIG. 8 and possibly any other processes or methods disclosed herein. It is also to be understood that the method of FIG. 8 is not necessarily carried out solely by apparatus 900. At least some operations of the method can be performed by one or more other entities.

Virtual Apparatus 900 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause transmitting unit 902, and any other suitable units of apparatus 900 to perform corresponding functions according one or more embodiments of the present disclosure.

As illustrated in FIG. 9, apparatus 900 includes transmitting unit 902. Transmitting unit 902 is configured to transmit, via a direct interface to a radio access network node or function, a trace request message comprising a request to initiate a trace on one or more user equipments.

Figure 10:
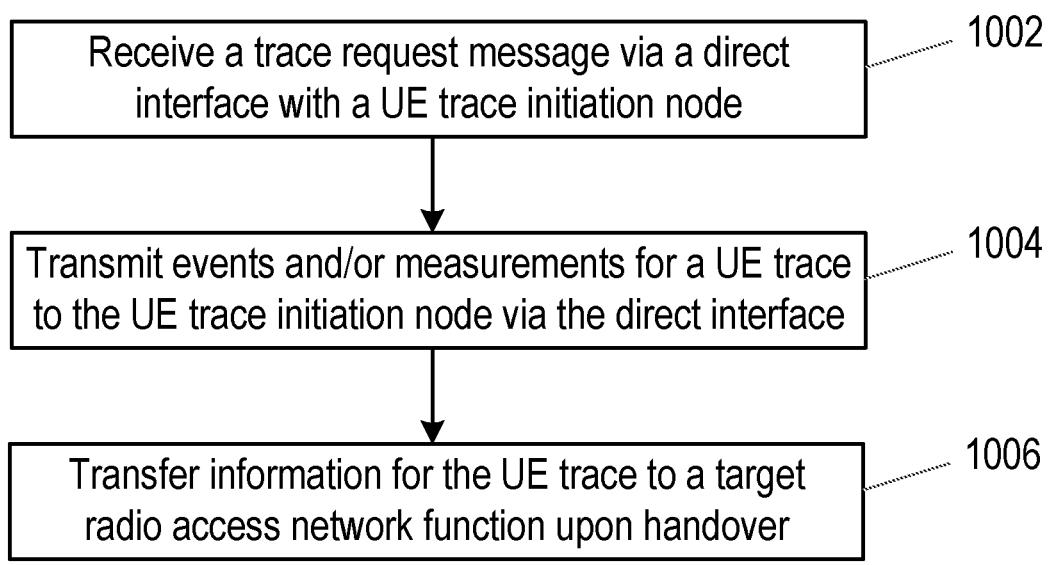
FIG. 10 is a flowchart showing a method in accordance with further embodiments of the disclosure.

FIG. 10 depicts a method in accordance with particular embodiments. The method may be performed by a base station or network node (such as the network node 560 described above), or a component part of a base station or network node. The component part may comprise a central unit (such as a CU-CP or CU-UP, for example) or a distributed unit (DU). The method of FIG. 10 may correspond in some respects to the signalling of the NF shown in FIG. 2.

The method begins at step 1002, in which the network node or component part thereof receives a trace request message via a direct interface with a UE trace initiation node. The trace request message comprises a request to initiate a trace on one or more UEs.

The trace request message may comprise a request to initiate a trace on one or more particular UEs, for example, by including identities of those UEs. The identity may comprise one or more of: C-RNTI, eNB UE S1AP ID, MME UE S1AP ID, AMF UE NGAP ID, and RAN UE NGAP ID, for example. Additionally or alternatively, the trace request message may comprise a request to initiate a trace on one or more classes of UEs. The classes may be determined by the UE trace initiation node based on an identifier such as an international mobile equipment identity, IMEI, or an IMEI software version, IMEISV, and used to determine specific UEs which can then be identified in the trace request message(s).

The trace request message may further comprise or be associated with one or more trace identifies used to identify the particular requested trace or traces. Where the trace request message comprises multiple trace identities, respective trace identities may be provided for each UE which is to be traced. These trace identities may be used subsequently by the NF, by including them in messages reporting UE trace events and measurements.

The trace may be local for the NF or follow the UE as it continues to roam in the network. Thus the trace request message may comprise an indication as to whether the trace is local for the NF (i.e. the trace does not need to follow the UE if it roams away from the NF), or whether the trace follows the UE as it roams. Further, the trace may be temporary in time (e.g. valid for a defined period), valid until a specific event occurs, or valid until terminated. These variables may be formulated jointly in a table, as shown in Table 3 below, where each requested trace will adhere to one row and column.

TABLE 3

Trace options

| Trace options | Valid during period | Valid until event | Valid until notice |
| --- | --- | --- | --- |
| Local to NF | | | |
| Following UE | | | |

A trace may require one or more measurements/events to be provided for the UE. Thus the trace request message may comprise one or more indications of the measurements and/or events which are to be reported to the UE trace initiation node as part of the trace. The events and/or measurements may be grouped using a unique name, which may be requested, e.g., handover related events, events over a defined interface, or events adhering to a specific NF type, e.g. CU-CP or DU.

The measurements/events relate to both signaling messages over the interfaces, that is, between RAN NFs (such as N2, F1, E1 and Xn for 5G RAN) or external events, and signaling messages within the NF, i.e., internal events.

The trace request message may further comprise an indication of one or more start conditions for the trace. For example, the start condition may comprise one or more of: a start time for the trace; an indication that the trace should start immediately (which may be a default assumption, in the absence of any start conditions); and one or more trigger events which trigger the trace to be started. The one or more trigger events may comprise one or more of: a radio metric for the UE meeting a threshold; a radio metric for the radio access network node or function meeting a threshold; and the UE entering a particular state (e.g., such as an RRC connectivity state). It will be understood by those skilled in the art that a radio metric meeting a threshold may correspond to a radio metric exceeding or falling below that threshold, depending on the particular radio metric (i.e. whether higher values correspond to positive outcomes, or lower values), and whether the trace is to be started upon a positive or negative event.

In step 1004, the network node or component part thereof transmits events and/or measurements for the UE trace defined in the trace request message to the UE trace initiation node via the direct interface.

In step 1006, upon handover of the UE to another network node (see FIG. 4, for example), or to another component part of the same network node (see FIG. 3, for example), the network node or component part thereof forwards information relating to the trace to the target radio access network node or function. For example, the UE Trace context (defined in the trace request message received in step 1002) may be transferred to the target radio access network node or function. The target RAN network node may be configured with a start condition to initiate one or more traces. For example, the target RAN network node may be configured to initiate a trace when a particular trace identity or UE identity enters or connects to the target RAN network function. Alternatively, the target RAN network function could, e.g. at Handover Request, fetch an UE trace context, associated with the UE identity or UE trace identity, from the UE trace initiation node, where the UE trace context contains information on the trace to be initiated, i.e. the UE trace configuration.

Figure 11:
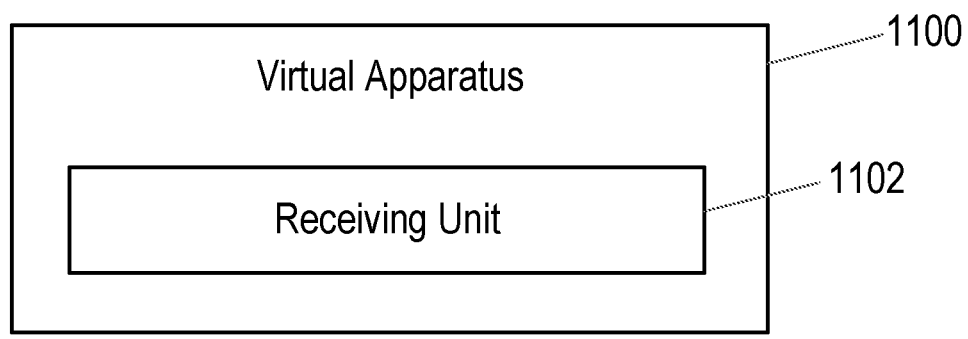
FIG. 11 shows a virtualization apparatus in accordance with further embodiments of the disclosure.

FIG. 11 illustrates a schematic block diagram of an apparatus 1100 in a wireless network (for example, the wireless network shown in FIG. 5). The apparatus may be implemented in a base station or network node (such as the network node 560 described above), or a component part of a base station or network node. The component part may comprise a central unit (such as a CU-CP or CU-UP, for example) or a distributed unit (DU). Apparatus 1100 is operable to carry out the example method described with reference to FIG. 10 and possibly any other processes or methods disclosed herein. It is also to be understood that the method of FIG. 10 is not necessarily carried out solely by apparatus 1100. At least some operations of the method can be performed by one or more other entities.

Virtual Apparatus 1100 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause receiving unit 1102, and any other suitable units of apparatus 1100 to perform corresponding functions according one or more embodiments of the present disclosure.

As illustrated in FIG. 11, apparatus 1100 includes receiving unit 1102. Receiving unit 1102 is configured to receive, via a direct interface with a UE trace initiation node, a trace request message comprising a request to initiate a trace on one or more user equipments.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

For the avoidance of doubt, the following numbered statements set out embodiments of the disclosure.

Group A Embodiments

1. A method performed by a UE trace initiation node for a wireless communication network, the method comprising:
   transmitting, via a direct interface to a radio access network node or function, a trace request message comprising a request to initiate a trace on one or more user equipments, UEs.
2. The method of embodiment 1, wherein the radio access network node or function comprises one or more of: a base station; a central unit control plane function of a base station; a central unit user plane function of a base station; and a distributed unit of a base station.
3. The method of embodiment 1 or 2, wherein the trace request message comprises a request to initiate a trace on a particular UE.
4. The method of embodiment 3, wherein the trace request message comprises an identity of the particular UE, such as an international mobile subscriber identity, IMSI.
5. The method of embodiment 1 or 2, wherein the trace request message comprises a request to initiate a trace on one or more classes of UEs.
6. The method of embodiment 5, wherein the trace request message comprises an identity of the class of UEs, such as an international mobile equipment identity, IMEI, or an IMEI software version, IMEISV.
7. The method according to any preceding embodiment, wherein the trace request message comprises an indication of whether the trace is local to the radio access network node or function, or whether the trace follows the one or more UEs as the one or more UEs roam the wireless communication network.
8. The method according to any preceding embodiment, wherein the trace request message comprises an indication of one or more events which are to be reported for the one or more UEs.
9. The method according to embodiment 8, wherein the one or more events comprise one or more of: handover-related events; events over one or more defined interfaces; and events involving one or more defined radio access network nodes or functions.
10. The method according to any preceding embodiment, wherein the trace request message comprises an indication of one or more measurements which are to be reported for the one or more UEs.
11. The method according to any preceding embodiment, wherein the trace request message comprises an indication of one or more start conditions for the trace.
12. The method according to embodiment 11, wherein the one or more start conditions comprise one or more of: a start time for the trace; an indication that the trace should start immediately; and one or more trigger events which trigger the trace to be started.
13. The method according to embodiment 12, wherein the one or more trigger events comprise one or more of: a radio metric for the UE meeting a threshold; a radio metric for the radio access network node or function meeting a threshold; and the UE entering a particular state.
14. The method according to any preceding embodiment, further comprising:
   receiving one or more events and measurements relating to the one or more UEs from nodes of the wireless communication network; and
   determining one or more of a location and an identity of the one or more UEs based on the one or more received events and measurements.
15. The method according to embodiment 14, wherein the location of the one or more UEs comprises an identity of the radio access network node or function.
16. The method according to any preceding embodiment, wherein the UE trace initiation node is located in the radio access network.
17. The method according to any preceding embodiment, wherein the UE trace initiation node is located in a core network.
18. The method according to any preceding embodiment, wherein the UE trace initiation node comprises a management node or function.

Group B Embodiments

19. A method performed by a radio access network node or function for a wireless communication network, the method comprising:
   receiving, via a direct interface with a UE trace initiation node, a trace request message comprising a request to initiate a trace on one or more user equipments, UEs.
20. The method of embodiment 19, wherein the radio access network node or function comprises one or more of: a base station; a central unit control plane function of a base station; a central unit user plane function of a base station; and a distributed unit of a base station.
21. The method of embodiment 19 or 20, wherein the trace request message comprises a request to initiate a trace on a particular UE.
22. The method of embodiment 21, wherein the trace request message comprises an identity of the particular UE, such as an international mobile subscriber identity, IMSI.
23. The method of embodiment 19 or 20, wherein the trace request message comprises a request to initiate a trace on one or more classes of UEs.
24. The method of embodiment 23, wherein the trace request message comprises an identity of the class of UEs, such as an international mobile equipment identity, IMEI, or an IMEI software version, IMEISV.
25. The method according to any of embodiments 19 to 24, wherein the trace request message comprises an indication of whether the trace is local to the radio access network node or function, or whether the trace follows the one or more UEs as the one or more UEs roam the wireless communication network.

26. The method according to any of embodiments 19 to 25, wherein the trace request message comprises an indication of one or more events which are to be reported for the one or more UEs.

27. The method according to embodiment 26, wherein the one or more events comprise one or more of: handover-related events; events over one or more defined interfaces; and events involving one or more defined radio access network nodes or functions.

28. The method according to any of embodiments 19 to 27, wherein the trace request message comprises an indication of one or more measurements which are to be reported for the one or more UEs.

29. The method according to any of embodiments 19 to 28, wherein the trace request message comprises an indication of one or more start conditions for the trace.

30. The method according to embodiment 29, wherein the one or more start conditions comprise one or more of: a start time for the trace; an indication that the trace should start immediately; and one or more trigger events which trigger the trace to be started.

31. The method according to embodiment 30, wherein the one or more trigger events comprise one or more of: a radio metric for the UE meeting a threshold; a radio metric for the radio access network node or function meeting a threshold; and the UE entering a particular state.

32. The method according to any of embodiments 19 to 31, further comprising:
upon handover of at least one of the one or more UEs to a target radio access network node or function, forwarding, to the target radio access network node or function, information relating to the trace.

Group C Embodiments

33. A base station, the base station comprising:
processing circuitry configured to perform any of the steps of any of the Group B embodiments;
power supply circuitry configured to supply power to the base station.

34. A component part for a base station, the component part comprising:
processing circuitry configured to perform any of the steps of any of the Group B embodiments;
power supply circuitry configured to supply power to the base station.

35. The component part according to the preceding embodiment, wherein the component part comprises a central unit or a distributed unit.

36. A UE trace initiation node, the UE trace initiation node comprising:
processing circuitry configured to perform any of the steps of any of the Group A embodiments; and
power supply circuitry configured to supply power to the UE trace initiation node.

The invention claimed is:

1. A method performed by a user equipment (UE) trace initiation node for a wireless communication network, the wireless communication network comprising a radio access network, the method comprising:
transmitting, via a direct interface to a radio access network node or function of the radio access network, a trace request message comprising a request to initiate a trace on one or more user equipments (UEs), wherein the UE trace initiation node is located in a management layer, as a management node or function, of the radio access network, wherein the trace request message comprises a request to initiate a trace on a particular UE and an identity of the particular UE.

2. The method according to claim 1, wherein the radio access network node or function comprises one or more of: a base station; a central unit control plane function of a base station; a central unit user plane function of a base station; and a distributed unit of a base station.

3. The method according to claim 1, wherein the trace request message comprises an indication of whether the trace on the one or more UEs is local to the radio access network node or function, or whether the trace on the one or more UEs follows the one or more UEs as the one or more UEs roam the wireless communication network.

4. The method according to claim 1, wherein the trace request message comprises an indication of one or more events which are to be reported for the one or more UEs.

5. The method according to claim 4, wherein the one or more events comprise one or more of: handover-related events; events over one or more defined interfaces; and events involving one or more defined radio access network nodes or functions.

6. The method according to claim 1, wherein the trace request message comprises an indication of one or more measurements which are to be reported for the one or more UEs.

7. The method according to claim 1, wherein the trace request message comprises an indication of one or more start conditions for the trace on the one or more UEs.

8. The method according to claim 7, wherein the one or more start conditions comprise one or more of: a start time for the trace; an indication that the trace should start immediately; and one or more trigger events which trigger the trace to be started.

9. The method according to claim 8, wherein the one or more trigger events comprise one or more of: a radio metric for a UE meeting a threshold; a radio metric for the radio access network node or function meeting a threshold; and a UE entering a particular state.

10. The method according to claim 1, further comprising:
receiving one or more events and measurements relating to the one or more UEs from nodes of the wireless communication network; and
determining one or more of a location and an identity of the one or more UEs based on the one or more received events and measurements.

11. The method according to claim 10, wherein the location of the one or more UEs comprises an identity of the radio access network node or function.

12. A method performed by a radio access network node or function of a radio access network for a wireless communication network, the method comprising:
receiving, via a direct interface with a user equipment (UE) trace initiation node, a trace request message comprising a request to initiate a trace on one or more user equipments (UEs), wherein the UE trace initiation node is located in a management layer, as a management node or function, of the radio access network, wherein the trace request message comprises a request to initiate a trace on a particular UE and an identity of the particular UE.

13. A component part for a base station, the component part comprising:

power supply circuitry configured to supply power to the component part; and processing circuitry configured to cause the component part to receive, via a direct interface with a user equipment (UE) trace initiation node, a trace request message comprising a request to initiate a trace on one or more user equipments (UEs), wherein the UE trace initiation node is located in a management layer, as a management node or function, of a radio access network, wherein the trace request message comprises a request to initiate a trace on a particular UE and an identity of the particular UE.

14. A user equipment (UE) trace initiation node, the UE trace initiation node comprising:

power supply circuitry configured to supply power to the UE trace initiation node; and processing circuitry configured to cause the UE trace initiation node to transmit, via a direct interface to a radio access network node or function of a radio access network, a trace request message comprising a request to initiate a trace on one or more user equipments (UEs), wherein the UE trace initiation node is located in a management layer, as a management node or function, of the radio access network, wherein the trace request message comprises a request to initiate a trace on a particular UE and an identity of the particular UE.

15. The UE trace initiation node according to claim 14, wherein the radio access network node or function comprises one or more of: a base station; a central unit control plane function of a base station; a central unit user plane function of a base station; and a distributed unit of a base station.

16. The UE trace initiation node according to claim 14, wherein the trace request message comprises an indication of whether the trace on the one or more UEs is local to the radio access network node or function, or whether the trace on the one or more UEs follows the one or more UEs as the one or more UEs roam the wireless communication network.

17. The UE trace initiation node according to claim 14, wherein the trace request message comprises an indication of one or more events which are to be reported for the one or more UEs.

18. The UE trace initiation node according to claim 17, wherein the one or more events comprise one or more of: handover-related events; events over one or more defined interfaces; and events involving one or more defined radio access network nodes or functions.

19. The UE trace initiation node according to claim 14, wherein the trace request message comprises an indication of one or more measurements which are to be reported for the one or more UEs.

20. The UE trace initiation node according to claim 14, wherein the trace request message comprises an indication of one or more start conditions for the trace on the one or more UEs.

* * * * *